United States Patent
Burts, Jr. et al.

(10) Patent No.: US 7,886,823 B1
(45) Date of Patent: *Feb. 15, 2011

(54) WELL REMEDIATION USING DOWNHOLE MIXING OF ENCAPSULATED PLUG COMPONENTS

(76) Inventors: Boyce D Burts, Jr., 101 Ravens Wood, Lafayette, LA (US) 70508; Boyce Donald Burts, III, 200 Southern Pines, Lafayette, LA (US) 70508; Freddie L. Sabins, 7007 Racquet Ct., Houston, TX (US) 77069; Larry Watters, 1006 Win, Spring, TX (US) 77373

( * ) Notice: Subject to any disclaimer, the term of this patent is extended or adjusted under 35 U.S.C. 154(b) by 0 days.

This patent is subject to a terminal disclaimer.

(21) Appl. No.: 11/162,450

(22) Filed: Sep. 9, 2005

Related U.S. Application Data

(60) Provisional application No. 60/608,255, filed on Sep. 9, 2004, provisional application No. 60/608,256, filed on Sep. 9, 2004, provisional application No. 60/608,257, filed on Sep. 9, 2004.

(51) Int. Cl.
*E21B 43/22* (2006.01)
*E21B 43/13* (2006.01)

(52) U.S. Cl. ...................... 166/300; 166/292
(58) Field of Classification Search .................. None
See application file for complete search history.

(56) References Cited

U.S. PATENT DOCUMENTS

| | | | | |
|---|---|---|---|---|
| 3,958,638 | A | * | 5/1976 | Johnston ...................... 166/294 |
| 5,343,968 | A | * | 9/1994 | Glowka ........................ 175/231 |
| 7,409,990 | B1 | * | 8/2008 | Burts et al. .................. 166/289 |
| 2005/0011648 | A1 | * | 1/2005 | Nguyen et al. ............... 166/276 |

* cited by examiner

*Primary Examiner*—Zakiya W. Bates
(74) *Attorney, Agent, or Firm*—J. M. Gilbreth; M. A. Gilbreth

(57) ABSTRACT

A two part encapsulated cementing system is mixed downhole in a method of remediation of an active well. Using this two part system, one of the components is first placed in the well at the desired remediation depth. Next, the other component is placed in the well above the first placed component. Densities of the components have been selected such that the density of the second placed component is sufficiently higher then the density of the first placed component to facilitate gravity mixing of the two components as the second placed component moves through the first placed component and in the process activation occurs.

10 Claims, No Drawings

WELL REMEDIATION USING DOWNHOLE MIXING OF ENCAPSULATED PLUG COMPONENTS

RELATED APPLICATION DATA

This application claims priority/benefit of U.S. Provisional Patent Application Ser. Nos. 60/608,255, 60/608,256, and 60/608,257, all filed Sep. 9, 2004, and all herein incorporated by reference.

BACKGROUND OF THE INVENTION

1. Field of the Invention

The present invention relates to wells, well operations, to methods, apparatus and products for operating wells. In another aspect, the present invention relates to wells, remediated wells, remediation of wells, to methods, apparatus and products for remediating wells, including oil, gas, water, geothermal, or analogous wells.

2. Brief Description of the Related Art

The hard impermeable mass deposited in the annular space in a well by primary cementing processes is subjected to a number of stresses during the lifetime of the well. The pressure inside the casing can increase or decrease as the fluid filling it changes or as additional pressure is applied to the well, such as when the drilling fluid is replaced by a completion fluid or by a fluid used in a stimulation operation. A change of temperature also creates stress in the cement, at least during the transition period before the temperatures of the steel and the cement come into equilibrium. It can become necessary to repair the primary cementing mass.

It is sometimes desirable in production of oil wells to place cement through perforations in the casing of the well both below and above the oil producing formation or zone. This cementing is carried out to prevent water and/or gas from migrating to the wellbore along with the oil. The intent is to leave the water and gas in the formations adjacent to the oil producing zone so that the water and gas will drive the oil to the wellbore, thereby increasing recovery of oil.

Squeeze cementing is a process of forcing a cement composition through perforations, holes or splits in a casing/wellbore annular space of a well in order to repair a primary cement job that failed due to the cement bypassing the mud (channeling); to eliminate water intrusion from above, below or within the hydrocarbon-producing zone; to reduce the producing gas to oil ratio by isolating gas zones from adjacent oil intervals; to repair casing leaks due to a corroded or split pipe; to plug all, or part, of one or more zones in a multizone injection well so as to direct the injection into the desired intervals; and to plug and abandon a depleted or watered-out producing zone.

Due to high pressures involved, squeeze cementing can be accompanied by problems such as propagating fractures. In addition, the use of conventional Portland cement has several potential problems of its own, particularly where high strength and good adhesion to the borehole wall are needed in order to effect good sealing. The presence of drilling mud pockets on channels under the primary cement may not only lead to failure of the primary cement job, but can adversely affect the strength of the squeeze cementing job. In addition, the presence of brine in the well can adversely affect both the primary and remedial cement jobs, increasing setting time and causing loss of strength of the cement.

U.S. Pat. No. 5,178,519, issued Jan. 12, 1993, to Striech et al., discloses a method and apparatus for performing a block squeeze cementing job. The invention provides for perforating the wellbore above and below the desired well formation on a single wireline trip and setting a lower packer on a wireline above the lower perforations. A stinger is positioned in the lower packer, and secondary packer elements on an upper packer are set above the upper perforations. Cementing of the lower perforations is carried out through the lower packer. The secondary packer elements are unset, and the stinger is repositioned adjacent to the upper perforations. Primary packer elements on the upper packer are then set, and the cementing of the upper perforations is carried out through the upper packer and stinger. Setting of the secondary packer elements requires only vertical movement of the tubing string and no rotation. Both cementing steps are carried out on a single tubing trip. The upper packer is retrievable, and the lower packer is of a drillable type. Hydraulic slips may be provided on the upper packer to prevent movement thereof during either cementing operation.

U.S. Pat. No. 6,065,539, issued May 23, 2000 to Noik et al., discloses a method of cementing a casing in a well drilled in the ground comprises injecting a liquid material comprising phenol-formol resin from the surface, wherein the resin is modified by means of a determined amount of furfuryl alcohol, and an amount of mineral filler unreactive towards the resin is added. The invention further relates to a thermosetting cementing material comprising phenol-formol resin. The resin is modified by means of an amount of furfuryl alcohol and comprises at least a proportion of an unreactive granular filler.

U.S. Pat. No. 6,591,909, issued Jul. 15, 2003 to Dao et al., discloses a method and composition is provided using whey protein as a retarder in a cementing composition for use in cementing operations in a subterranean zone penetrated by a well bore.

U.S. Pat. No. 6,767,867, issued Jul. 27, 2004 to Chatterji et al., discloses methods of treating subterranean zones penetrated by well bores in primary well cementing operations, well completion operations, production stimulation treatments and the like. The methods are basically comprised of introducing into the subterranean zone an aqueous well treating fluid comprised of water and a water soluble polymer complex fluid loss control additive.

U.S. Pat. No. 6,899,177, issued May 31, 2005 to Chatterji et al., discloses methods of cementing subterranean zones penetrated by well bores using cement compositions having enhanced compressive strengths are provided. A method of the invention basically comprises the steps of preparing or providing a cement composition having enhanced compressive strength upon setting comprising a hydraulic cement, sufficient water to form a slurry and a hydroxyamine compressive strength enhancing additive. Thereafter, the cement composition is placed in a subterranean zone to be cemented and allowed to set into an impermeable solid mass therein.

In spite of the advances in the prior art, conventional cement systems suffer from a 6 hour safety margin to dump the slurry; long set times; low shear bond values; long cement lengths, and long wait on cement (WOC) times causing high expense.

Thus, there still exists a need in the art for improved methods, apparatus and products for remediating wells.

SUMMARY OF THE INVENTION

According to one embodiment of the present invention, there is provided an active well (i.e, it's not abandoned) comprising a well bore; a first component residing in the wellbore; and, a second component having a density greater than the density of the first component, and positioned residing in the wellbore at a point above the first component that will allow for gravity flow of the second component down into the first component. The first and second components are encapsulated components that upon contact with each other form a cementing plug.

According to even another embodiment of the present invention, there is provided a method of remediating an active well. The method includes providing a two component separately encapsulated cementing system, each component having a density greater than the density of any well fluid residing in the well. The method also includes selecting a first component and a second component from the group consisting of an A-list of components and a B-list of components, wherein the first component and the second component are different, and the density of the second component is higher than the density of the first component. The method even further includes placing the first component in the well. The method still further includes placing the second component in the well at a point above the first component that will allow for gravity flow of the second component down into contact with the first component.

According to still another embodiment of the present invention, there is provided a method of remediating an active well. The method includes providing a two component separately encapsulated cementing system, each component having a density greater than the density of any well fluid residing in the well. The method also includes selecting a first component and a second component from the group consisting of an A-list of components and a B-list of components, wherein the first component and the second component are different, and the density of the second component is higher than the density of the first component. The method even further includes placing the first component in the well. The method still further includes placing the second component in the well at a point above the first component that will allow for gravity flow of the second component down into contact with the first component. The method yet further includes allowing the first and second components to gravity contact and form a cement plug.

DETAILED DESCRIPTION OF THE INVENTION

The method of the present invention for remediating an active well involves the use of a two part plugging composition, which is incorporated into known plugging methods. As used herein "active well" refers to any well that is not an abandoned well or one that is not undergoing abandonment. For example, a well during the process of drilling, an operating producing well, and the like.

The method of the present invention for plugging an abandoned well involves the use of a two part plugging composition, which is incorporated into known plugging methods.

The present invention will utilize any of the known agglomeration and encapsulation technology to bind and coat powders into pellets that will perform as described.

In the present invention, the two powders are pelletized separately to withstand the trip down hole and then release to form a settable mix with water. The encapsulated material is protected from being wetted by well fluids and is of sufficient particle size and density to allow falling through clear well fluids at a rate of at least 1 foot/second. The encapsulation coating degrades with time and/or temp to release components.

The table below outlines several pairs sets of two solid components for use in the present invention. While the table is shown with components A and B paired, it is also possible to create pairs by picking one or more from A and one or more from B. Acidic or basic conditions are required for some of the reactions. It is possible to encapsulate NaOH adsorbed onto DE or a salt of an organic acid as a means of providing required pH.

| Component A | Component B |
|---|---|
| $Na_2SiO_3$ | $Ca(OH)_2$ |
| $Na_2SiO_3$ | AlOOH |
| $NaPO_3$ | $Ca(OH)_2$ |
| $CaHPO_4$ | $Ca(OH)_2$ |
| $CaHPO_4$ | $Ca(OH)_2$ + base |
| $Na_2SiO_3$ | silica + acid |
| Silica | $Ca(OH)_2$ + base |
| Silica | Alumina + base |
| $Al_2(HPO_4)_3$ | $Ca(OH)_2$ + base |
| $Na_2SiO_3$ | $NaAlO_2$ |
| MgO | $MgCl_2$ |

Examples of suitable compositions include Component 1—50% silica flour+15% $Ca(OH)2$+15% $Na_2SiO_3$+20% PVA binder. Component 2—NaOH adsorbed onto DE 12% active.

In particular, the two part plugging composition of the present invention comprises one or more components selected from an A-list of components and one or more components selected from a B-list of components. Each component is separately encapsulated. In absence of the encapsulation the components will form a cementing plug.

The encapsulation on the encapsulated component is designed to degrade upon contact with the well fluid. The timing of the degradation can to tailored to fit the desired well operation. Generally, the first placed component will be allowed sufficient time to settle and degrade. The second placed component should be designed to be degraded by the time it is passing thru the first component.

In the present invention, the cementing system not only contains the components, but may optionally include additives to improve thermal stability, control set time, generate expansion, and control fluid loss. The additives may be incorporated into the system directly, or into one or both of the components.

While any cementing system may be utilized, it is desired that the system exhibit one or more, preferably several if not all, of the following characteristics: no shrinkage upon set up, maintains (or causes an increase in) the wellhole pressure; hydrophobic; density allows it to fall thru the well fluid at a suitable rate; and non-gas generating (so as not to cause micro channels).

In the present invention, accelerated set times are generally less than 12 hours, preferably less than 10 hours, more preferably less than 8 hours, even more preferably less than 6 hours, still more preferably less than 4 hours, and yet more preferably less than 2 hours.

The resulting cementing system may bond to the casing and or other formation surfaces in the well. The pipe may have coating of oil or water based drilling mud.

The method of the present invention for remediation of wells, includes any of the known remediation methods in which is utilized the two component plugging composition as the cementing material. While a generalized remediation method is described below, it should be understood that any suitable remediation method as is known in the art, including any described above in the background or described in any cited reference (all of which are herein incorporated by reference), may be utilized with the plugging composition of the present invention.

The cementing compositions of the invention are useful in a number of repair and remediation cementing operations including those operations to plug lost circulation and other undesirable fluid inflow and outflow zones in wells, to plug cracks and holes in pipe strings cemented therein and to accomplish other required remedial well operations. Generally, these repair and remediation cementing processes used in a well during its productive life are referred to as secondary cementing. In the practice of the present invention the compositions of the present invention may be utilized in any known secondary cementing method including any of the remediation cementing methods disclosed in any of the references cited herein, all of which are herein incorporated by reference.

In general secondary cementing is carried out by placing components of a cementing composition from a source at the ground surface downhole to the point of repair and/or remediation. The components of the cementing composition are then allowed to set into a hard impermeable mass. Any method known in the art for placing and/or positioning components of a cementing composition downhole at the point of remediation may be used herein, all of which are herein incorporated by reference.

Generally in the practice of the method of the present invention, one of the components is selected as the first placed component and placed in the well at the desired remediation location, followed by placement of the other component as the second placed component in the well at a position above the first component, to allow the second component to gravity flow into the first component.

Any suitable apparatus and method for the delivery of the components may be utilized. As non-limiting examples, suitable delivery systems may utilize a dump bailer, coiled tubing and jointed tubing. They require a base to stack up against such as a packer, petal basket or sand plug. While any suitable delivery mechanism can be utilized, more specific non-limiting examples of suitable delivery mechanisms include: dump bailer run on electric line or slick line; pumping through tubing, drillpipe, work strings or any tubulars; allowing fall through fluids via gravity; and pumping into an annullas or pipe without displacing (i.e., "bull heading").

It is crucial that the first and second components have greater densities than the well fluid density. It is also crucial that the second placed component have a density greater than the first placed component so that the second placed component may displace the first component.

In some instances the selected first and second components will not have suitable densities, specifically, the densities of the first and second components may not be greater than that of the well fluid, or they may not have the suitable density for the order in which they are desired to be introduced into the well, or the densities may not have a suitable enough differential to achieve suitable displacement.

The present invention provides for the utilization of weighting agent additives to the first and second components to change the density of those components. Suitable additives to change the density include metal salts, preferably calcium chloride. Other examples of weighting agents include sand, barite, hemitite, calcium carbonate, FeO, MgO, and manganese ore. Sufficient amounts of the additive are utilized to achieve the desired density.

In the remediation method of the present invention first and second components are provided which have densities greater than the well fluid, with the component to be placed second having a greater density than the component to be placed first. Should the density of the first or second component need adjustment, a weighting agent as discussed above, will be added as necessary. The component with the greater density is then introduced into the well fluid at a position on top of sand/petal basket, the other component is then placed above the first placed component so that it may spontaneously gravity flow into contact the first placed fluid. The density difference will allow displacement of the first placed fluid by the second placed fluid and allow for in-situ mixing.

It should be appreciated that the rate of displacement and thus in-situ mixing will increase with increasing density differential between the first and second components, and decrease with decreasing density differential between the first and second components.

It should also be appreciated that at some point, the density differential between the first and second components is so low as to result in too slow of displacement.

On the other hand, it should further be appreciated that at some point, the density differential between the first and second components is so great as to result in too rapid of displacement so as to avoid much mixing.

Thus, the density differential should be selected so as to provide fast enough displacement for the plugging operation, and to facilitate sufficient in-situ mixing, and this differential can be determined on a case by case basis, for example by observation in clear container and trial and error.

Typical densities for the well fluid will be in the range of about 8.33 ppg up to about 20.0 ppg, with typical densities for the components in the range of about 8.33 ppg up to about 22.0 ppg.

It should be understood that other well fluid additives as are well known in the art may be incorporated into the first and/or second component, or added before, along with, or after the introduction of the first and/or second component, non-limiting examples of which include surfactants, surface bond enhancers (non-limiting examples include styrene butadiene latex, polyvinal alcohols, resins, other adhesives), emulsifiers, ph control agents, fluid loss additives, gas prevention additive, dispersants, expanding agents, and wetting agents.

Although the present invention has been illustrated by preferred reference to two component encapsulated systems, it should be understood that any plugging composition having two or more components can be encapsulated and utilized in the present invention.

All materials cited herein, including but not limited to any cited patents, publications, articles, books, journals, brochures, are herein incorporated by reference.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A method of remediating a well having a well fluid residing in the well, the method comprising:
   (A) providing an encapsulated component A and an encapsulated component B, wherein component A and component B will upon contact form into a cement plug, and each having a density greater than the density of the well fluid;
   (B) selecting a first component and a second component from the group consisting of encapsulated component A and an encapsulated component B, wherein the first component and the second component are different, and the density of the second component is higher than the density of the first component;

(C) placing the first component in the well to be remediated;

(D) placing the second component in the well at a point above the first component that will allow for gravity flow of the second component down into contact with the first component.

2. The method of claim 1, wherein steps (C) and (D) are carried out utilizing one or more of a dump bailer; pumping through tubing, drillpipe, work strings or tubulars; gravity flow; and bull heading.

3. The method of claim 1, wherein the first component is the encapsulated component A, and the second component is the encapsulated component B.

4. The method of claim 1, wherein the first component is the encapsulated component B, and the second component is the encapsulated component A.

5. The method of claim 1, wherein the well fluid density is in the range of about 8.33 ppg up to about 20.0 ppg, the encapsulated component A density is in the range of about 8.33 ppg up to about 22.0 ppg, and the encapsulated component B density is in the range of about 8.33 up to about 22.0 ppg.

6. A method of remediating a well having a well fluid residing therein, the method comprising:

(A) providing an encapsulated component A and an encapsulated component B, wherein component A and component B will upon contact form into a cement plug, and each having a density greater than the density of the well fluid;

(B) selecting a first component and a second component from the group consisting of encapsulated component A and an encapsulated component B, wherein the first component and the second component are different, and the density of the second component is higher than the density of the first component;

(C) placing the first component in the well to be remediated;

(D) placing the second component in the well at a point above the first component that will allow for gravity flow of the second component down into contact with the first component; and (E) allowing the first and second components to gravity contact and form a cement plug.

7. The method of claim 6, wherein steps (C) and (D) are carried out utilizing one or more of a dump bailer; pumping through tubing, drillpipe, work strings or tubulars; gravity flow; and bull heading.

8. The method of claim 6, wherein the first component is the encapsulated component A, and the second component is the encapsulated component B.

9. The method of claim 6, wherein the first component is the encapsulated component B, and the second component is the encapsulated component A.

10. The method of claim 6, wherein the well fluid density is in the range of about 8.33 ppg up to about 20.0 ppg, the encapsulated component A density is in the range of about 8.33 ppg up to about 22.0 ppg, and the encapsulated component B density is in the range of about 8.33 up to about 22.0 ppg.

* * * * *